US008126968B2

(12) United States Patent
Rodman et al.

(10) Patent No.: US 8,126,968 B2
(45) Date of Patent: Feb. 28, 2012

(54) SYSTEM AND METHOD FOR COORDINATING A CONFERENCE USING A DEDICATED SERVER

(75) Inventors: Jeffrey Rodman, San Francisco, CA (US); Gil Pearson, San Francisco, CA (US)

(73) Assignee: Polycom, Inc., Pleasanton, CA (US)

( * ) Notice: Subject to any disclaimer, the term of this patent is extended or adjusted under 35 U.S.C. 154(b) by 2376 days.

(21) Appl. No.: 10/032,766

(22) Filed: Dec. 26, 2001

(65) Prior Publication Data

US 2002/0103864 A1    Aug. 1, 2002

Related U.S. Application Data

(60) Provisional application No. 60/258,529, filed on Dec. 26, 2000.

(51) Int. Cl.
*G06F 15/16* (2006.01)
*H04L 12/16* (2006.01)
*H04Q 11/00* (2006.01)

(52) U.S. Cl. .................. 709/205; 709/204; 370/261

(58) Field of Classification Search .................. 709/204, 709/205; 370/261, 260; 379/205, 202.01, 379/202.1, 204.1, 205.1, 207.1
See application file for complete search history.

(56) References Cited

U.S. PATENT DOCUMENTS

| | | | |
|---|---|---|---|
| 4,945,412 A | 7/1990 | Kramer | |
| 5,812,652 A * | 9/1998 | Jodoin et al. | 379/205.01 |
| 5,916,302 A | 6/1999 | Dunn et al. | |
| 5,995,608 A * | 11/1999 | Detampel et al. | 379/205.01 |
| 5,999,966 A | 12/1999 | McDougall et al. | |
| 6,272,176 B1 | 8/2001 | Srinivasan | |
| 6,288,739 B1 * | 9/2001 | Hales et al. | 348/14.07 |
| 6,501,739 B1 * | 12/2002 | Cohen | 370/260 |
| 6,501,740 B1 * | 12/2002 | Sun et al. | 370/261 |
| 6,760,749 B1 * | 7/2004 | Dunlap et al. | 709/204 |
| 7,006,616 B1 * | 2/2006 | Christofferson et al. | 379/202.01 |

(Continued)

FOREIGN PATENT DOCUMENTS

CA    2 242 318 A1    6/2000

(Continued)

OTHER PUBLICATIONS

Microsoft Corporation, "Windows NetMeeting," Microsoft Windows Technologies: NetMeeting Home, http://www.microsoft.com/windows/netmeeting, Updated: Jun. 1999, Mar. 2000 and Jan. 2002.

(Continued)

*Primary Examiner* — David England
(74) *Attorney, Agent, or Firm* — Wong, Cabello, Lutsch, Rutherford & Brucculeri, LLP (57) ABSTRACT

A system and method are described for initiating and conducting a data conference between a plurality of conference endpoints linked in communication by a private or public computer network. A first conference endpoint then sends a conference initialization request to a dedicated conference server coupled to the computer network. Upon receipt of the conference initialization request, the conference server responsively generates a conference code uniquely identifying the conference and transmits the code to the first conference endpoint. The first conference endpoint subsequently converts the received conference code to a form (such as a string DTMF tone) which can be transmitted by in-band audio to other conference endpoints. The other participating conferencing endpoints, after receipt of the conference code, are configured to log on to the conference server using the conference code.

24 Claims, 6 Drawing Sheets

U.S. PATENT DOCUMENTS

| | | | |
|---|---|---|---|
| 7,062,025 B2 * | 6/2006 | Summers et al. | 379/202.01 |
| 2001/0016038 A1 * | 8/2001 | Sammon et al. | 379/202.01 |
| 2002/0051518 A1 * | 5/2002 | Bondy et al. | 379/35 |
| 2003/0035527 A1 * | 2/2003 | Baker | 379/207.01 |
| 2003/0072298 A1 | 4/2003 | Slobodin et al. | 370/352 |
| 2003/0072429 A1 | 4/2003 | Slobodin et al. | 379/202.01 |
| 2003/0125954 A1 * | 7/2003 | Bradley et al. | 704/270 |
| 2005/0180342 A1 * | 8/2005 | Summers et al. | 370/261 |
| 2007/0078931 A1 * | 4/2007 | Ludwig et al. | 709/204 |
| 2007/0192410 A1 * | 8/2007 | Liversidge et al. | 709/204 |

FOREIGN PATENT DOCUMENTS

| | | |
|---|---|---|
| EP | 0 969 687 A1 | 5/2000 |
| GB | 2 335 825 A | 9/1999 |
| WO | 96/37068 A1 | 11/1996 |

OTHER PUBLICATIONS

Supplementary European Search Report received in corresponding application No. EP 01 27 3950 dated Dec. 30, 2008.

* cited by examiner

SYSTEM AND METHOD FOR COORDINATING A CONFERENCE USING A DEDICATED SERVER

CROSS-REFERENCES TO RELATED APPLICATIONS

This application claims the benefit of Provisional Patent Application Serial No. 60/258,529, filed on Dec. 26, 2000, entitled "System and Method for Coordinating a Conference Using a Dedicated Server," which is incorporated herein by reference.

BACKGROUND OF THE INVENTION

1. Field of the Invention

The present invention relates to conference endpoints, and more particularly to a system and method for initializing and conducting a data conference between a plurality of conference endpoints linked by a private or public network.

2. Description of Related Art

The use of audio and video conferencing devices has increased dramatically in recent years. Such devices (collectively denoted herein as "conference endpoints") facilitate communication between persons or groups of persons situated remotely from each other, and allow companies having geographically dispersed business operations to conduct meetings of persons or groups situated at different offices, thereby obviating the need for expensive and time-consuming business travel.

Often in the course of a conference, participants at a local conference site may find it desirable to transmit relevant data to a remote conferencing site. The term "data" is used herein to denote any information encoded into a form capable of being transmitted electronically over a network. For example, the local conference participant may wish to transmit a document in Microsoft Word format for examination and comment by a remote participant. Alternatively, the local participants may desire to transmit a presentation file comprising a set of slides to the remote conferencing site.

There are a number of commercially available software packages which enable, to varying degrees, integration of data sharing into an ongoing audio or video conference. For example, NetMeeting™, from Microsoft® Corporation, allows video or audio conference participants to collaborate via application sharing, or a shared clipboard or whiteboard. However, these products typically involve complex and lengthy setup and configuration procedures requiring training or a relatively high level of technical sophistication. Users having limited experience may find it difficult to utilize such products, and may thus be dissuaded from using these products.

Another disadvantage of prior art data conferencing software relates to the distribution of security codes. Data sharing in a business setting frequently involves proprietary or otherwise sensitive material. Access to such material must be limited to only authorized conference participants. Often, security codes, such as passwords, are utilized to prevent unauthorized parties from gaining access to a conference involving sensitive material.

To set up a security code-protected conference, the conference organizer may be required to distribute the security code to each of the authorized conference participants. Distribution of the security code may be performed by announcing the security code over a voice communication channel. However, this method requires all participants to note the security code and enter the security code into a conference endpoint via a keypad or similar input device. If a participant mis-enters the security code (which may be likely, particularly if the code consists of a long sequence of randomly generated numbers or characters, or if the participant is unfamiliar with the operation of the conference endpoint) then the participant will not succeed in accessing the conference. Furthermore, announcing the security code over a voice communication channel may compromise the security of the conference since unauthorized parties may overhear the security code.

In view of the above-discussed limitations and disadvantages associated with prior art conference endpoints, there is a need for an improved system and method for initiating and managing a data conference between or among a plurality of conference endpoints. There is a more specific need for a method for securing data conferences which does not require each participant to enter a security code at their corresponding conference endpoint.

SUMMARY OF THE INVENTION

The present invention provides a system and method for initiating and managing a data conference between or among a plurality of participating conference devices, referred to herein as conference endpoints. The conference endpoints are linked to each other and to a dedicated conference server by a private network or a public network such as the Internet. Each of the conference endpoints includes a Public Switched Telephone Network (PSTN) or similar interface to enable voice communication between and among the several conference endpoints through a conventional audio or video bridge. Preferably, the conference endpoints are also equipped with a speaker and a display device for presenting received audio data and images.

To initialize a data conference, one of the participating conference endpoints sends a conference initiation request over the network to a conference server. In a preferred embodiment, a data conference initiation sequence is activated by depressing a single key or button located on the conference endpoint or an associated remote control. Upon receipt of the conference initiation request, the conference server generates a conference code that uniquely identifies the data conference. The conference code is transmitted over the network to the requesting conference endpoint.

Responsive to the receipt of the conference code, the requesting conference endpoint transmits a conference invitation to remote conference endpoints via the audio or video bridge. The conference invitation typically comprises a string of DTMF tones which incorporates the conference code. Each of the conference endpoints is configured to continuously monitor audio signals received via the audio bridge to detect the transmission of the conference invitation. When the conference invitation has been received, the receiving conference endpoint responsively transmits a conference join request over the network to the conference server. The conference server then adds the network address and other identifying information of the receiving conference endpoint to a data conference participant list.

After data conference participants have been logged onto the conference server, the conference server may then distribute conference data to the participants. According to one mode of the invention, each of the conference endpoints receives conference data through a standard browser interface. The conference server is accordingly configured to generate a web page corresponding to the conference and, if necessary, convert the conference data to a format which can be recognized and displayed by browsers running on the participating conference endpoints. For example, the conference server may convert documents to GIF or JPEG encoded images that can be displayed in a browser window. Conversion of the conference data to a standard format enables viewing of the conference data by conference endpoints that are not equipped with proprietary software.

The system and method of the present invention advantageously allow multi-point data conferences to be quickly and easily initiated by users having limited technical expertise. The invention further enables the data conference to be secured without requiring action (entry of a code or password) by the conference participants.

DESCRIPTION OF THE PREFERRED EMBODIMENT

The present invention generally comprises a system and method for initiating and managing data conferences conducted between or among plural conference endpoints. The term "conference endpoint", as used herein, is intended to mean any device or combination of devices capable of displaying or presenting audio/visual information received from a remote conference endpoint and transmitting audio/visual information to the remote conference endpoint for display or presentation therein. Examples of conference endpoints include the SoundStation® Conference Phone and the ViewStation™ MP multi-point video conference endpoint, both manufactured and sold by Polycom, Inc. of Milpitas, Calif.

Figure 1:
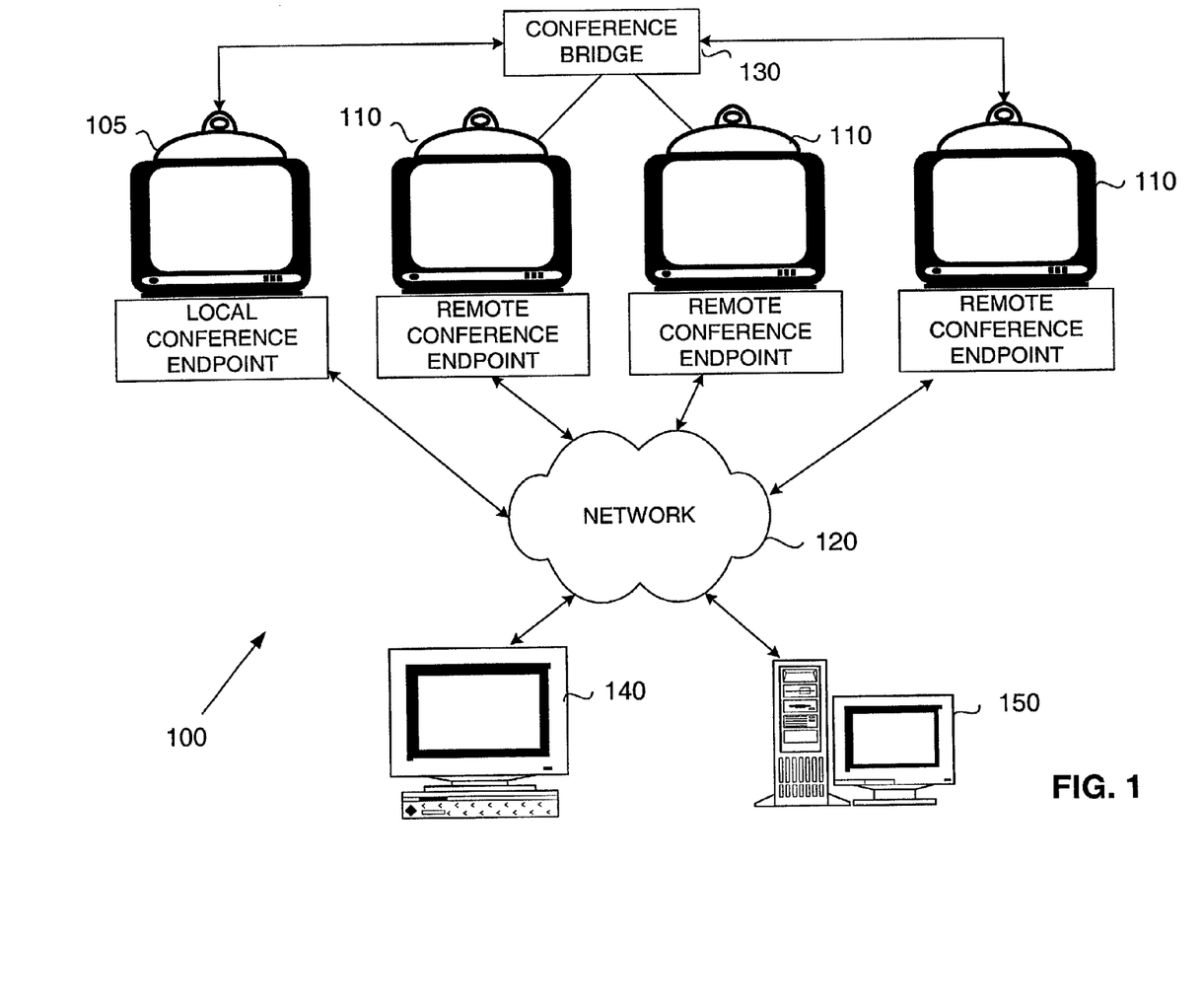
FIG. 1 depicts an exemplary operating environment including a local conference endpoint and a plurality of remote conference endpoints coupled to a computer network, in accordance with an embodiment of the invention.

FIG. 1 depicts an exemplary operating environment 100 according to an embodiment of the present invention. The operating environment 100 includes a local conference endpoint 105 and a plurality of remote conference endpoints (collectively denoted as 110) coupled to a computer network 120. The network 120 may be a private network such as a corporate LAN, a public network such as the Internet, or a plurality of interconnected networks. The local conference endpoint 105 and remote conference endpoints 110 are each provided with an appropriate network interface (not shown), such as an Ethernet card or high-speed modem, enabling them to transmit and receive information over the network 120.

A conference server 150 is also connected to the network 120, and is configured to receive and transmit information over the network 120 to and from the local and remote conference endpoints 105 and 110. As will be discussed in further detail below, the conference server 150 is operative to coordinate the formation of data conferences between participating local and remote conference endpoints 105 and 110, and is further operative to manage the distribution of data, such as document files, to the participating local and remote conference endpoints 105 and 110. In a typical implementation of the invention, the conference server 150 may comprise a personal computer (PC) having a conventional processor. Furthermore, the conference server 150 may be coupled to the network 120 by any suitable interface, including an Ethernet card, T-1 connection, or high-speed modem.

One or more personal computers 140 may also be located at nodes of the network 120. As will be discussed in further detail below, a personal computer user may access the conference by manually entering a conference code.

The local conference endpoint 105 and remote conference endpoints 110 are also conventionally connected to a Public Switched Telephone Network (PSTN). Accordingly, a conference bridge 130 is utilized to establish an audio conference (or a video conference having an audio component) between the participating local and remote conference endpoints 105 and 110, respectively. Thus, the conference bridge 130 allows the local conference endpoint 105 to hear speech generated at the remote conference endpoints 110, and further, to transmit near speech to the remote conference endpoints 110. As is known in the art, the conference bridge 130 may comprise a single bridge having a relatively large number of ports or the conference bridge 130 may comprise a plurality of bridges distributed over the PSTN. The conference bridge 130, preferably, transmits in-band audio signals.

Figure 2:
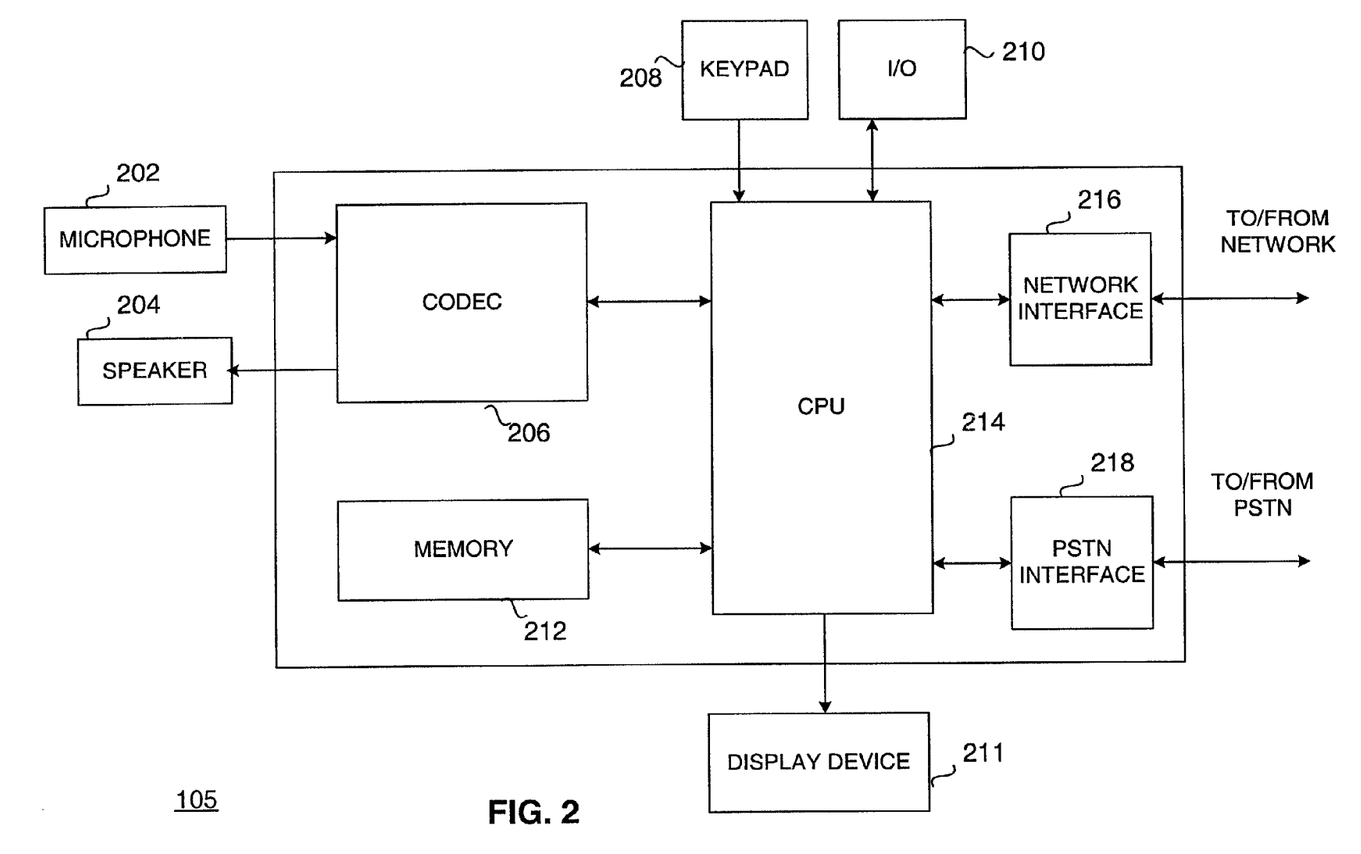
FIG. 2 depicts in block form components of a conference endpoint, in accordance with an embodiment of the invention.

FIG. 2 depicts in block form components of the local conference endpoint 105. The conference endpoint configuration depicted in FIG. 2 also exemplifies components of the remote conference endpoints 110. The local conference endpoint 105 is provided with a microphone 202 for sensing speech of local conference participants and responsively generating electronic audio signals representative of the local speech. A speaker 204 converts audio signals representative of speech from remote conference participants to audible sound. At least one codec 206 performs the required digital-to-analog or analog-to-digital signal conversion in connection with the microphone 202 and speaker 204.

A keypad 208 is utilized to manually enter alphanumeric information into the local conference endpoint 105. Other input/output devices 210, for example, a mouse, trackball, or printer, may be coupled to the local conference endpoint 105 for receiving input from or presenting output to a user.

The local conference endpoint 105 is provided with a memory 212, which may include one or a combination of random access memory (RAM), read only memory (ROM), and/or storage devices such as magnetic hard disks, CD-ROMs, and magneto-optical drives. The memory 212 is used for storing executable program instructions, text and graphics files, and other data, and is coupled to a central processing unit (CPU) 214, which executes program instructions and manages communications between and among the several components of the local conference endpoint 105. The CPU 214 transmits and receives information to and from the network 120 (FIG. 1) through a conventional network interface 216, such as an Ethernet card or analog modem. The CPU 214 is also configured to receive and transmit information over the PSTN through a telephone line or PSTN interface 218.

The local conference endpoint 105 may further include a display device 211 for displaying video information and conference data received over the network 120 (FIG. 1). The conference data may be embodied in conventional file formats, for example, a document encoded in Microsoft Word format or a visual or multimedia presentation encoded in Microsoft Powerpoint® format. The video information may include, for example, images of the remote conference participants generated by a video camera located at the remote conference endpoint 110.

Figure 3:
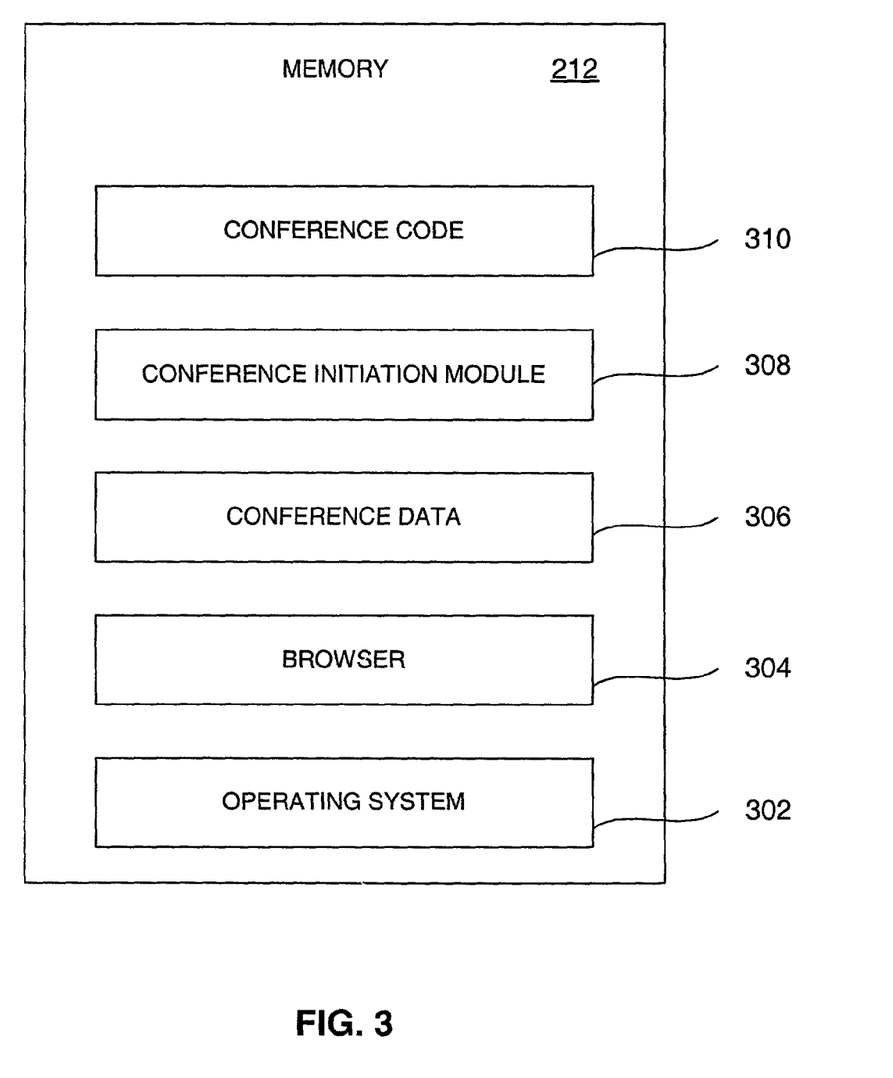
FIG. 3 depicts exemplary contents of conference endpoint memory, in accordance with an embodiment of the invention.

FIG. 3 depicts exemplary contents of the memory 212. The memory 212 preferably includes an operating system 302, a browser 304, conference data 306, a conference initiation module 308, and a conference ID code 310. The operating system 302 allocates memory, manages communications between local conference endpoint 105 components, and performs other low-level operations of the local conference endpoint 105. The browser 304 is preferably a conventional browser (for example, Microsoft® Internet Explorer or Netscape Navigator®), which is used for viewing and interacting with HTML-encoded web pages received over the network 120 (FIG. 1). The memory 212 may also hold a set of files containing conference data 306. The files may comprise, for example, a document encoded in Microsoft Word format or a visual or multimedia presentation encoded in Microsoft Powerpoint® format. One or more applications (not shown), such as Microsoft Word, may additionally be stored in the memory 212 to increase the functionality of the local conference endpoint 105.

The conference initiation module 308 resident in the memory 212 is operative to perform two related functions associated with initiating data conferences. In a first mode, the conference initiation module 308, responsive to predetermined user input, petitions the conference server 150 (FIG. 1) to create a new data conference. For example, the keypad 211 (FIG. 2) may include, in addition to conventional alphanumeric keys, a "data conference start" key engageable by a user of the local conference endpoint 105 (FIG. 1). When the "data conference start" key is engaged [or a comparable command is entered through the keypad 211 (FIG. 2) or other input device 210 (FIG. 2)], the conference initiation module 308 is launched. The conference initiation module 308 proceeds to initiate a data conference by transmitting a data conference initiation request to the conference server 150 over the network 120 (FIG. 1). This initiation process includes transmission of the conference ID code 310, which will be discussed in further detail in connection with FIG. 6.

In a second operative mode of the data conference initiation module 308, signals received from the PSTN interface 218 (FIG. 2) are monitored to detect the presence of a data conference invitation. As will be discussed in further detail in connection with FIG. 6, the conference invitation will typically comprise a string of DTMF (dual tone multi frequency) tones encoding the unique conference ID code 310 generated by the conference server 150 (FIG. 1) responsive to a conference initiation request transmitted by an initiating conference endpoint. When the data conference invitation has been detected, the data conference initiation module 308 is configured to transmit a conference join command to the conference server 150 over the network 120 (FIG. 1).

Figure 4:
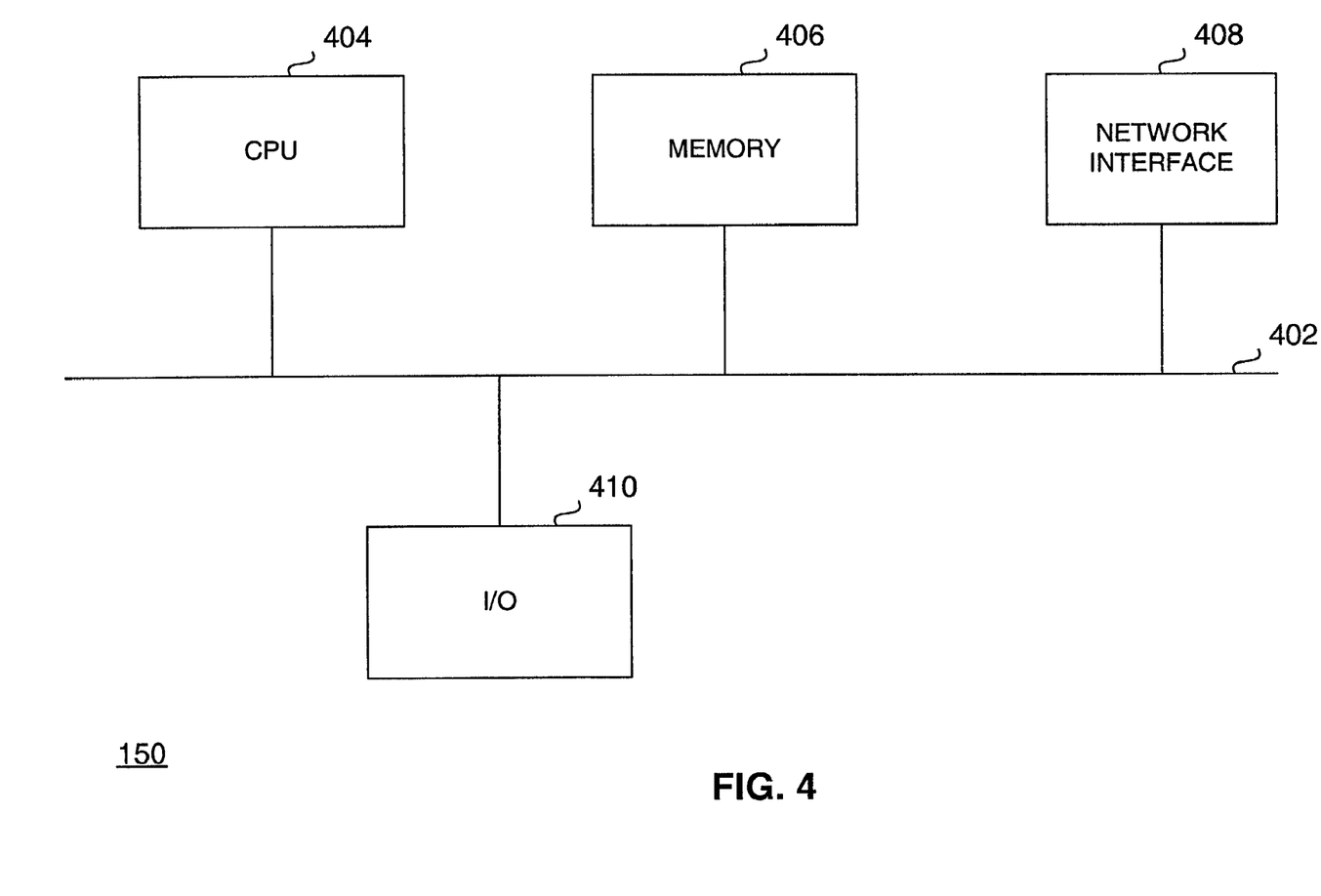
FIG. 4 depicts in block form components of a conference server, in accordance with an embodiment of the invention.

Referring now to FIG. 4, an exemplary block diagram of the conference server 150 is shown. The conference server 150 includes a CPU 404, memory 406, a network interface 408, and input/output device 410 all coupled to a system bus 402. The CPU 404 executes program instructions and coordinates communication between and among the different components of the conference server 150. The memory 406, which may variously comprise one or a combination of RAM, ROM, or storage devices having magnetic or optical storage media, holds there within programs, files and other data. The conference server 150 is enabled to transmit and receive information to and from the local and remote conference endpoints 105 and 110 (FIG. 1) and other devices, such personal computer 140 (FIG. 1), connected to the network 120 (FIG. 1) by the network interface 408. Other input/output devices 410, such as a keyboard, mouse, monitor or printer, may be coupled to the bus 402 to provide additional functionality.

Figure 5:
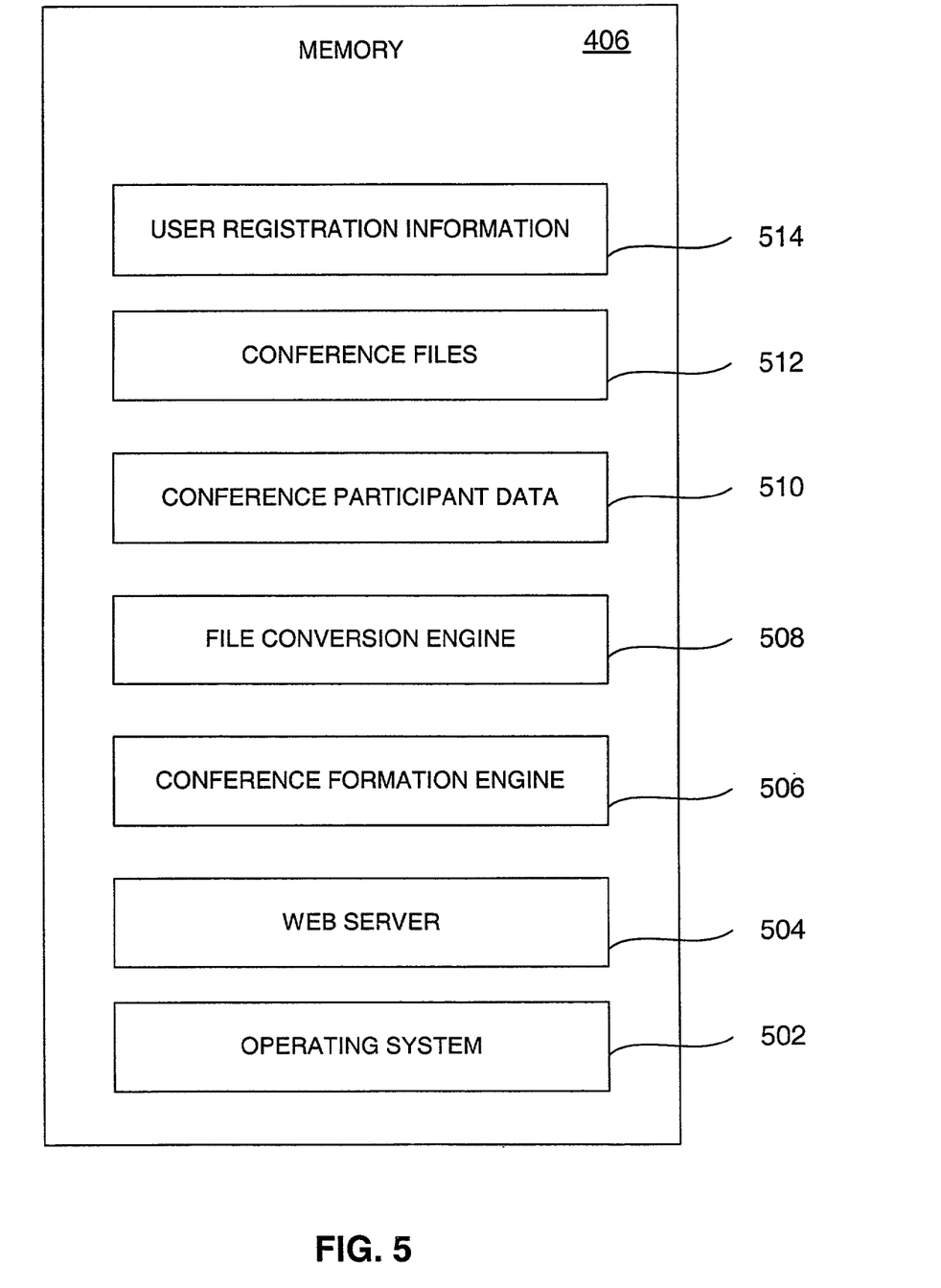
FIG. 5 depicts exemplary contents of server memory, in accordance with an embodiment of the invention.

FIG. 5 shows an exemplary server memory 406, which preferably includes an operating system 502 for allocating memory and performing various low-level functions and a conventional web server 504 for preparing and transmitting HTML-encoded web pages to the local and remote conference endpoints 105 and 110 and other network-connected devices, such as personal computers 140. The server memory 406 additionally stores a set of programs, files, and other data utilized by the conference server 150 (FIG. 1) to perform data conference management operations. Further, a conference formation engine 506 coordinates formation of data conferences responsive to the conference initiation requests received from local and remote conference endpoints 105 and 110. Additionally, a file conversion engine 508 is configured to convert files from a proprietary format to a standard format which can be recognized and displayed by each participating conference endpoint, such as local and remote endpoints 105 and 110, respectively.

Also stored in server memory 406 is conference participant data 510, conference files 512, and user registration information 514. Conference participant data 510 includes identifying information for each participant in an ongoing data conference. The identifying information may include a device ID uniquely identifying the conference endpoint corresponding to the participant, a network address, and the conference code 310 (FIG. 3). Additional information stored in conference participant data 510 may include, for example, conference privileges associated with specific participants (e.g., data presenter privileges).

The conference files 512 may include, as a non-limiting example, Microsoft PowerPoint, Word, and Excel files that are being presented by a participant at one of the local and remote conference endpoints 105 or 110 (FIG. 1). User registration data 514 includes identification and privilege information for users that are authorized to utilize services offered by conference server 150 (FIG. 1), and which is used by the server 150 to verify authorized users (described in reference to FIG. 6).

Figure 6:
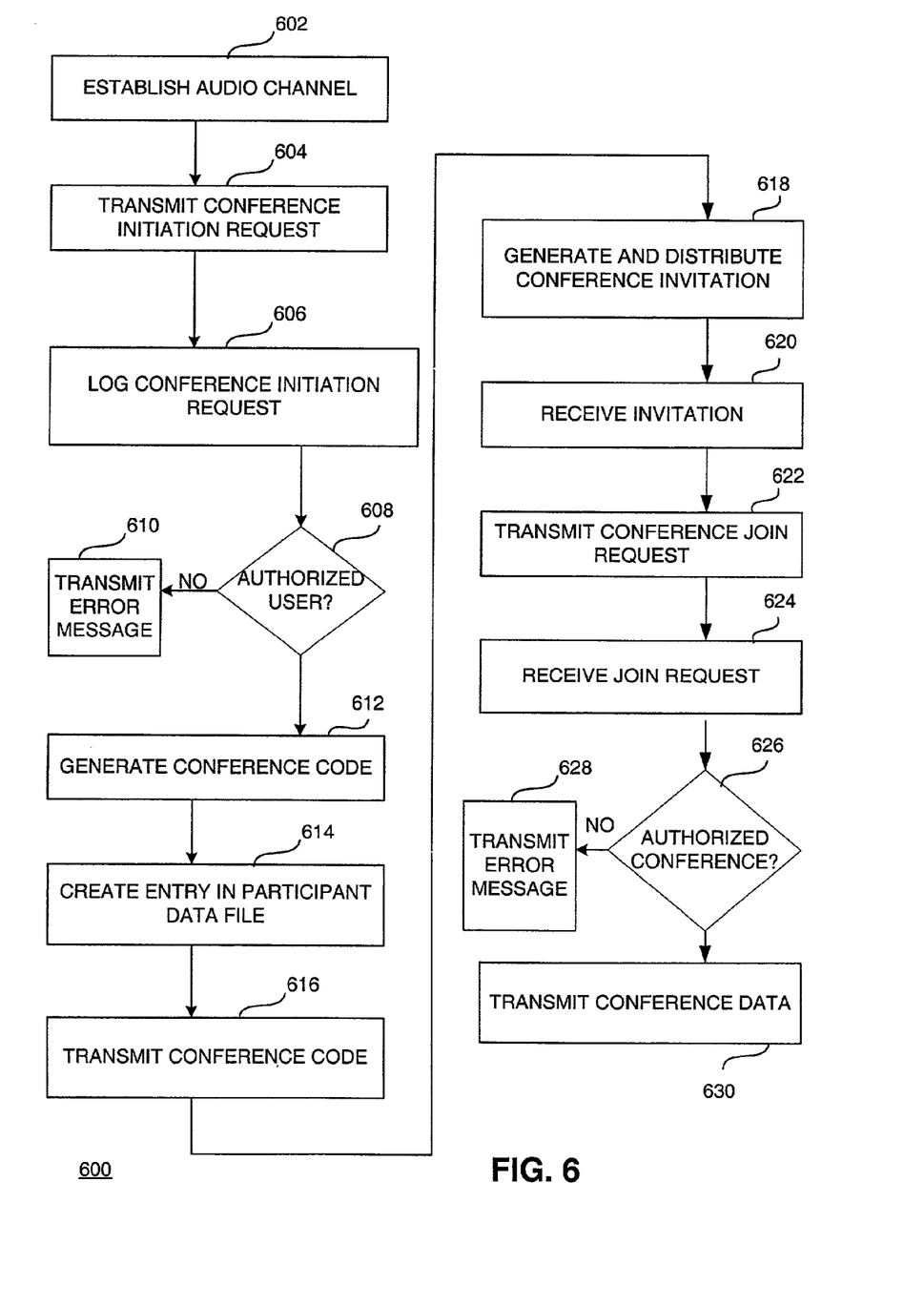
FIG. 6 is a flowchart depicting a method for coordinating a data conference, in accordance with the present invention.

FIG. 6 is a flowchart 600 depicting steps for coordinating a data conference in accordance with one embodiment of the present invention. In step 602, an audio communication channel is established between all participating conference endpoints, such as local conference endpoint 105 and remote conference endpoint 110 (FIG. 1). As discussed above, the audio communication channel is typically established by utilizing a multi-port audio conference bridge 130 (FIG. 1). The local and remote conference endpoints 105 and 110 conventionally access the conference bridge 130 by dialing a telephone number and entering a code assigned to the conference bridge 130. Furthermore, a personal computer 140 (FIG. 1) equipped with appropriate telephony equipment and architecture, can similarly access the conference via conference bridge 130 or through the network 120 (FIG. 1) via an interface such as a modem.

When conference participants in audio communication with each other desire to launch a data conference, one conference participant (deemed the "host") causes the corresponding conference endpoint to transmit a conference initiation request to the conference server 150 (FIG. 1) in step 604. For purposes of illustration, the local conference endpoint 105 is assumed to be the conference host in this embodiment. As discussed above in connection with FIG. 3, the local and remote conference endpoints 105 and 110 are preferably provided with a "data conference start" button on an associated keypad 211 (FIG. 2). A user simply engages this button to start the data conference. Alternately, the user may enter a predetermined alphanumeric code via the keypad 211 to start the data conference.

Additionally in step 604, responsive to engagement of the "data conference start" key (or comparable user action) the conference initiation module 308 (FIG. 3) transmits a conference initiation request to the conference server 150 via the network 120. The conference initiation request will typically include a network address of the local conference endpoint 105 and a conference endpoint identifier code uniquely identifying the local conference endpoint 105. The conference initiation request may be sent in any protocol suitable for transmission over the network, for example, Simple Mail Transfer Protocol (SMTP).

In step 606, a conference formation engine 506 (FIG. 5) of the conference server 150 is operative to log the conference initiation request upon receipt thereof. Next in step 608, the conference formation engine 506 may compare the conference endpoint identifier code against a list of such identifier codes stored in a user registration data 514 (FIG. 5) to determine if the requesting endpoint is authorized to use the services of the conference server 150. In some implementations of the invention, a conference server 150 may be configured to provide data conference services only to conference endpoints belonging to a commercial organization, or alternatively, to provide data conference services only to users who have paid a fee. If the received endpoint identifier code does not match any of the codes in the user registration data 514, then the server 150 refuses to provide service and sends an error message to the requesting host conference endpoint 105 in step 610.

Assuming that the identifier code of the local conference endpoint 105 is on the list stored in the user registration data 514 (FIG. 5) (or that no checking is performed), the conference formation engine 506 (FIG. 5) then generates a conference code 310 (FIG. 3) uniquely identifying the data conference, step 612. To enhance security and prevent unauthorized access to the data conference, the conference code 310 may comprise a random n-character code generated in accordance with standard randomization techniques. At step 614, the conference server 150 then creates a new entry including the conference code 310 and user ID of the host conference endpoint in the conference participant data file 510 (FIG. 5).

Next instep 616, the conference code 310 (FIG. 3) is transmitted to the host conference endpoint 105 over the network 120 using a suitable transmission protocol. Upon receipt of the conference code 310 at the host conference endpoint 105, a conference initiation module 308 (FIG. 3) stores the conference code 310 in memory 212 (FIG. 3) and generates a conference invitation for transmission to other conference endpoints (e.g., remote conference endpoints 110) via the conference bridge 130 in step 618. The conference invitation may typically comprise a string of DTMF tones incorporating the conference code 310 supplied by the conference server 150. For example, if the supplied conference code is "67890", the host conference endpoint 105 may transmit the DTMF tones corresponding to "11*67890", wherein the "11*" string alerts the receiving conference endpoint that a conference invitation is being sent and that the conference code 310 follows. Those skilled in the art will recognize that many other techniques can be utilized to transmit the encoded conference invitation through the in-band audio signal.

Additionally, the conference code 310 may be transmitted to a personal computer 140 (FIG. 1) user, allowing the user to manually enter the conference code 310 into a web page transmitted by a web server 504 (FIG. 5) of the conference server 150 (FIG. 1), resultantly accessing the data conference.

The conference code 310 may be transmitted to the personal computer 140, for example, orally over an existing audio connection if the personal computer 140 is connected to the local and remote endpoints 105 and 110 over the conference bridge 130. Alternatively, the conference code 310 may be securely transmitted to personal computer 140 through the network 120 by the conference initiation module 308 of the host conference endpoint 105 via a network interface 216 (FIG. 2).

As discussed above, each of the remote conference endpoints 110 is preferably provided with a conference initiation module, such as module 308 (FIG. 3), which monitors received audio signals to detect for a conference invitation in step 620. When the conference initiation module 308 detects the conference invitation, the initiation module 308 extracts, therefrom, the conference code 310 (FIG. 3) for storage in the remote conference endpoint 110 memory. In step 622, the conference initiation module 308 of the remote conference endpoint 110 then sends (by any suitable protocol) a conference join request to the conference server 150 over the network 120. The conference join request will typically include the network address of the joining conference endpoint 110, together with the conference code 310 specifically identifying the data conference the remote conference endpoint 110 is requesting to join. The conference initiation module 308 of the remote conference endpoint 110 may also be configured to launch a browser, similar to browser 304 (FIG. 3), to enable viewing of conference data files 512 (FIG. 5) in the manner described in further detail below.

It is noted that one or more of the conference endpoints, such as remote conference endpoint 110 may not be provided with the capability of accessing the data conference. Participant(s) associated with such a conference endpoint will be able to continue to participate in an audio conference with the other conference participants but will not be able to view documents or slides contained in the conference data.

Responsive to receipt of a conference join request in step 624, the conference server 150 compares the conference code 310 included in the join request to a list of conference codes in conference participant data 510 (FIG. 5) corresponding to ongoing (initiated) data conferences in step 626. If the transmitted code 310 matches an ongoing conference code, the conference server 150 enters participant identifying information associated with a conference join requester, into the conference participant data 510. If the conference code 310 does not correspond to any ongoing data conference, the conference server 150 transmits an error message to the requesting remote conference endpoint 110 in step 628.

Once the host conference endpoint 105 is connected to the conference server 150 through network 120 and the conference code 310 has been verified, the conference server 150 is operative to transmit the conference data files 512 (FIG. 5) uploaded to the conference server 150 and to the local and remote conference endpoints 105 and 110 over the network 120 in step 630. As previously discussed, the conference data 512 may comprise, for example, a set of presentation slides in Powerpoint format. In accordance with one embodiment of the invention, the conference server 150 creates an HTML-encoded web page and converts the conference data 512 to a format (such as a GIF or JPEG) which may be displayed inside a browser window. The web page is then transmitted to the local and remote conference endpoints 105 and 110. A conventional browser 304 (FIG. 3) executing on the local and remote conference endpoint 105 or 110 receives the HTML page and displays information accordingly.

According to one embodiment of the invention, one or more conference participants at the remote conference endpoints 110 are given certain privileges with respect to control of the conference. For example, the host conference endpoint 105 may be designated as the conference "presenter", whereby the participant associated with the host conference endpoint 105 may select which data (documents, slides, or the like) are distributed to the other participating conference endpoints 110. This feature may be achieved by including appropriate controls and graphics in the web page transmitted to the host conference endpoint 105 by the web server 504 (FIG. 5) of conference server 150.

A web page embodying this feature may be configured to include a presentation toolbar having a set of options or functions for remotely presenting data. In particular, the presentation toolbar may have a "select data file" function allowing the remote conference endpoint 110 user to select a data file from the conference data 306 stored at the remote conference endpoint 110 or from the conference files 512 previously stored at the conference server 150 to be presented to the conference participants. Additionally, the web page may include "next slide" and "previous slide" control functions for causing the conference server 150 to transmit to conference participants the next or previous slide, respectively. Those skilled in the art will recognize that a toolbar and associated options and controls may be generated by embedding appropriate scripts or applets within the web page transmitted by the conference server 150.

The conference server is preferably configured to simultaneously manage a plurality of conferences, each of the plurality of conferences having at least two participants and being identified by a unique conference code. The server may generate and store administrative information relating to each conference, such as the identity of the initiating conference endpoint, the length of the conference, and the number of conference participants. This administrative information may be later used for billing purposes Those skilled in the art will also recognize that previously displayed data files may also be cached at the local and remote conference endpoints 105 and 110 to enable rapid display thereof (i.e., avoiding the need to re-transmit the previously displayed file) should the presenter wish to return to the previously displayed files for further review or clarification.

It will further be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment and for particular applications, those skilled in the art will recognize that its usefulness is not limited thereto and that the present invention can be utilized in any number of environments and implementations.

It will be further recognized by those skilled in the art that a machine readable medium can encompass a program that can be executed by a machine to perform the method steps for coordinating a conference, where the method steps may include transmitting a conference initiation request to a conference server over a computer network, receiving a conference code from the conference server in response to the conference initiating request over the computer network, generating an audio signal representative of the conference code, and transmitting the audio signal to at least one conference endpoint over a conference bridge.

What is claimed is:

1. A conference endpoint comprising:
    a CPU;
    a telephone line interface for coupling said conference endpoint to a telephone line;
    a network interface for coupling said conference endpoint to a computer network;
    a microphone for generating near speech signals for transmission over said telephone line, said near speech signals being representative of speech of a near conference participant;
    a speaker for converting to sound remote speech signals received from a remote device over said telephone line, said remote speech signals being representative of speech of at least one remote conference participant;
    a data conference initiation module, coupled to said network interface and to said telephone line interface for transmitting a data conference initiation request to a conference server over said computer network, for receiving a data conference code generated by said conference server, wherein said data conference code, when presented to said conference server by said remote device, authorizes said remote device to join said data conference, and for responsively transmitting over said telephone line a data conference invitation to said remote device, said conference invitation including information representative of said data conference code; and
    a memory for storing one or more files containing conference data distributed by said conference server via said computer network during a data conference,
    wherein said CPU is coupled to said telephone line interface, said network interface, said data conference initiation module, and said memory.

2. The conference endpoint of claim 1, wherein said data conference initiation module transmits said conference initiation request in response to a predetermined user input.

3. The conference endpoint of claim 1, further comprising a display device coupled to said network interface for displaying said conference data.

4. The conference endpoint of claim 1, wherein said conference data comprises video information.

5. The conference endpoint of claim 1, wherein the data conference initiation module is further configured to transmit a conference join request to said conference server over said computer network responsive to a received conference invitation.

6. The conference endpoint of claim 1, wherein said conference invitation comprises a string of Dual Tone Multi-Frequency (DTMF) tones.

7. The conference endpoint of claim 1, further comprising a web browser for displaying said conference data, wherein said conference data comprises text and graphical information.

8. The conference endpoint of claim 1, wherein said data conference initiation module is further configured for transmitting over said computer network a data conference invitation to said remote device.

9. A method for initiating and managing a data conference from a near conference endpoint, comprising:
    at the near conference endpoint:
    establishing a connection over a telephone line with at least one remote conference endpoint;
    transmitting a data conference initiation request to a conference server over a computer network;
    receiving from the conference server a unique data conference code corresponding to said data conference initiation request, wherein said data conference code, when presented to said conference server, authorizes said at least one remote conference endpoint to join said data conference;

generating an audio signal representative of said data conference code;

transmitting said audio signal to said at least one remote conference endpoint over said telephone network; and receiving one or more files containing conference data distributed by said conference server via said computer network during said data conference.

10. The method of claim 9, wherein the act of generating an audio code comprises generating a string of DTMF tones.

11. The method of claim 9, wherein the act of transmitting a data conference initiation request is performed in response to a predetermined user input.

12. A method for initiating and managing a data conference at a conference server, the method comprising the acts of:

at said conference server:

receiving a conference initiation request from a first conference endpoint over a computer network;

generating a conference code in response to said conference initiation request, wherein said conference code when presented to said conference server by one or more second conference endpoints authorizes said one or more second conference endpoints to join said data conference;

transmitting said conference code to said first conference endpoint over the computer network;

maintaining a list of data conference participants based on received data conference join requests from said first and said one or more second conference endpoints; and distributing one or more files comprising conference data to said data conference participants over said computer network.

13. The method of claim 12, wherein the act of distributing one or more files comprising conference data comprises transmitting a web page.

14. The method of claim 12, wherein said conference data is representative of a document.

15. The method of claim 12, wherein said conference data is representative of a presentation slide.

16. The method of claim 12, further comprising the act of converting at least one of said one or more files from a first format to a second format.

17. A machine readable medium having embodied thereon a program, the program being executable by a machine to perform method acts for coordinating a data conference utilizing electronic means, the method acts comprising:

at a near conference endpoint:

transmitting a data conference initiation request to a conference server over a computer network;

receiving a conference code from said conference server over said computer network in response to said data conference initiation request, wherein said conference code, when presented to said conference server by at least one remote conference endpoint, authorizes said at least one remote conference endpoint to join said data conference;

generating an audio signal representative of said conference code;

transmitting said audio signal to said at least one remote conference endpoint over a telephone line; and transmitting one or more files comprising conference data to said conference server for distribution to said at least one remote conference endpoint via said computer network during said data conference.

18. A machine readable medium having embodied thereon a program, the program being executable by a machine to perform method acts for coordinating a data conference utilizing electronic means, the method acts comprising:

at a remote conference endpoint:

receiving an audio signal representative of a conference code from at least one conference endpoint over a telephone line wherein said conference code, when presented to a conference server by said remote conference endpoint, authorizes said remote conference endpoint to join said data conference;

transmitting a data conference join request including said conference code to said conference server over a computer network in response to receiving said audio signal; and receiving one or more files comprising conference data distributed by said conference server via said computer network during said data conference.

19. A conference endpoint comprising:

a CPU;

a telephone line interface for coupling said conference endpoint to a telephone line;

a network interface for coupling said conference endpoint to a computer network;

a microphone for generating near speech signals for transmission over said telephone line, the near speech signals being representative of speech of a near conference participant;

a speaker for converting to sound remote speech signals received from a remote device over said telephone line, the remote speech signals being representative of speech of at least one remote conference participant;

a data conference initiation module coupled to said network interface and to said telephone line interface and configured to receive over said telephone line interface from a remote conference endpoint a data conference invitation including information representative of a data conference code, wherein said data conference code, when presented to a conference server by said endpoint, authorizes said endpoint to join said data conference, and further configured to transmit a data conference join request including said data conference code to said conference server over said computer network in response to the received conference invitation; and a memory for storing one or more files containing conference data distributed by said conference server via said computer network during a data conference, wherein said CPU is coupled to said telephone line interface, said network interface, said data conference initiation module, and said memory.

20. The conference endpoint of claim 19, further comprising a display device coupled to said network interface for displaying said conference data.

21. The conference endpoint of claim 19, wherein said conference data comprises video information.

22. The conference endpoint of claim 19, wherein said data conference invitation comprises a string of dual tone multi-frequency (DTMF) tones.

23. The conference endpoint of claim 19, further comprising a web browser for displaying said conference data, wherein said conference data comprises text and graphical information.

24. The conference endpoint of claim 19, wherein said data conference initiation module is further configured for receiving over said computer network a data conference invitation from said remote conference endpoint.

* * * * *